US012032920B2

United States Patent
Jia et al.

(10) Patent No.: US 12,032,920 B2
(45) Date of Patent: Jul. 9, 2024

(54) DIRECT SPEECH-TO-SPEECH TRANSLATION VIA MACHINE LEARNING

(71) Applicant: Google LLC, Mountain View, CA (US)

(72) Inventors: Ye Jia, Mountain View, CA (US);
Zhifeng Chen, Sunnyvale, CA (US);
Yonghui Wu, Palo Alto, CA (US);
Melvin Johnson, Sunnyvale, CA (US);
Fadi Biadsy, Sandyston, NJ (US); Ron Weiss, New York, NY (US); Wolfgang Macherey, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 747 days.

(21) Appl. No.: 17/056,554

(22) PCT Filed: Mar. 7, 2020

(86) PCT No.: PCT/US2020/023169
§ 371 (c)(1),
(2) Date: Nov. 18, 2020

(87) PCT Pub. No.: WO2020/205233
PCT Pub. Date: Oct. 8, 2020

(65) Prior Publication Data
US 2021/0209315 A1 Jul. 8, 2021

Related U.S. Application Data

(60) Provisional application No. 62/826,258, filed on Mar. 29, 2019.

(51) Int. Cl.
*G06F 40/47* (2020.01)
*G06F 40/58* (2020.01)

(52) U.S. Cl.
CPC .............. *G06F 40/47* (2020.01); *G06F 40/58* (2020.01)

(58) Field of Classification Search
CPC ................................ G06F 40/47; G06F 40/58
See application file for complete search history.

(56) References Cited

U.S. PATENT DOCUMENTS

2018/0046618 A1\* 2/2018 Lee ........................ G06N 3/08
2019/0122145 A1\* 4/2019 Sun ....................... G06N 20/00

OTHER PUBLICATIONS

Haque A, Guo M, Verma P. Conditional end-to-end audio transforms. arXiv preprint arXiv:1804.00047. Mar. 30, 2018. (Year: 2018).\*
International Preliminary Report on Patentability for PCT/US2020/023169, dated Oct. 14, 2021, 9 pages.

(Continued)

*Primary Examiner* — Ibrahim Siddo
(74) *Attorney, Agent, or Firm* — DORITY & MANNING P.A.

(57) ABSTRACT

The present disclosure provides systems and methods that train and use machine-learned models such as, for example, sequence-to-sequence models, to perform direct and text-free speech-to-speech translation. In particular, aspects of the present disclosure provide an attention-based sequence-to-sequence neural network which can directly translate speech from one language into speech in another language, without relying on an intermediate text representation.

19 Claims, 6 Drawing Sheets

(56) References Cited

OTHER PUBLICATIONS

Aguero et al., "Prosody generation in the Speech-to-Speech Translation", IEEE International Conference on Acoustics Speech and Signal Processing, May 14-19, 2006, Toulouse, France, 4 pages.
Anastasopoulos et al., "Tied Multitask Learning for Neural Speech Translation", North American Chapter of the Association for Computational Linguistics: Human Language Technologies, Jun. 1-6, 2018, New Orleans, LA, 10 pages.
Arik et al., "Neural Voice Cloning with a Few Samples", $32^{nd}$ Conference on Neural Information Processing Systems, Dec. 2-8, 2018, Montreal, Canada, 11 pages.
Bahdanau et al., "Neural Machine Translation by Jointly Learning to Align and Translate", arXiv:1409.0473v7, May 19, 2016, 15 pages.
Berard et al., "End-to-End Automatic Speech Translation of Audiobooks", IEEE International Conference on Acoustics, Speech and Signal Processing (ICASSP), Apr. 15-20, 2018, Alberta, Canada, 5 pages.
Berard et al., "Listen and Translate: A Proof of Concept for End-to-End Speech-to-Text Translation", arXiv:1612.01744v1, Dec. 6, 2016, 5 pages.
Bladsy et al., "Parrotron: An End-to-End Speech-to-Speech Conversion Model and its Application to Hearing-Impaired Speech and Speech Separation", Interspeech 2019, Sep. 15-19, 2019, Graz, Austria, pp. 4115-4119.
Casacuberta et al., "Some Approaches to statistical and finite-state speech-to-speech translation", Computer Speech and Language, vol. 18, 2004, 23 pages.
Chen et al., "Sample Efficient Adaptive Text-to-Speech", arXiv:1809.10460v3, Jan. 16, 2019, 16 pages.
Chiu et al., "State-Of-The-Art Speech Recognition With Sequence-To-Sequence Models", International Conference on Acoustics, Speech, and Signal Processing, Apr. 15-20, 2018, Alberta, Canada, 5 pages.
Do et al., "Toward Expressive Speech Translation: A Unified Sequence-to-Sequence LSTMs Approach for Translating Words and Emphasis", Interspeech 2017, Aug. 20-24, 2017, Stockholm, Sweden, 5 pages.
Griffin et al., "Signal Estimation from Modified Short-Time Fourier Transform", IEEE Transactions on Acoustics, Speech, and Signal Processing, vol. 32, No. 2, 1984, pp. 236-243.
Guo et al., "End-to-End Spoken Language Translation", arXiv:1904.10760v1, Apr. 23, 2019, 9 pages.
Hsu et al., "Hierarchical Generative Modeling for Controllable Speech Synthesis", Seventh International Conference on Learning Representations, May 6-9, 2019, New Orleans, LA, 27 pages.
International Telecommunication Union, "ITU-T F.745: Functional requirements for network-based speech-to-speech translation services", ITU, 2016, 20 pages.
Irie et al., "Model Unit Exploration for Sequence-To-Sequence Speech Recognition", arXiv:1902.01955v1, Feb. 5, 2019, 5 pages.
Jia et al., "Leveraging Weakly Supervised Data to Improve End-To-End Speech-To-Text Translation", arXiv:1811.02050v2, Feb. 10, 2019, 5 pages.
Jia et al., "Transfer Learning from Speaker Verification to Multispeaker Text-to-Speech Synthesis", $32^{nd}$ Conference on Neural Information Processing Systems, Dec. 2-8, 2018, Montreal, Canada, 11 pages.
Kalchbrenner et al., "Efficient Neural Audio Synthesis", International Conference on Machine Learning, Jul. 10-15, 2018, Stockholm, Sweden, 10 pages.
Kano et al., "End to end Model for Cross-Lingual Transformation of Paralinguistic Information", Machine Translation, vol. 32, 2018, 22 pages.
Karger et al., "Facts and Figures about the Verbmobil Project", Verbmobil: Foundations of Speech-to-Speech Translation, Springer, Jul. 2000, pp. 22-30.
Krueger et al., "Zoncout: Regularizing RNNs by Randomly Preserving Hidden Activations", arXiv:1606.01305v4, Sep. 22, 2017, 11 pages.
Kurimo et al., "Personalising speech-to-speech translation in the EMIME project", System Demonstration at ACL 2010, Jul. 11-16, 2010, Uppsala, Sweden, 6 pages.
Lavie et al., "JANUS-III: Speech-to-speech translation in multiple languages," IEEE International Conference on Acoustics, Speech, and Signal Processing, Apr. 21-24, 1997, Munich, Germany, 5 pages.
Lee et al., "Robust and Fine-Grained Prosody Control of End-to-End Speech Synthesis", arXiv:1811.02122v2, Feb. 18, 2019, 5 pages.
Machado et al., "Voice Conversion: A Critical Survey", $7^{th}$ Sound and Music Computing Conference, Jul. 21-24, 2010, Barcelona, Spain, pp. 291-298.
Matusov et al., "On the Integration of Speech Recognition and Statistical Machine Translation", $9^{th}$ European Conference on Speech Communication and Technology, Sep. 4-8, 2005, Lisbon, Portugal, 4 pages.
Nachmani et al., "Fitting New Speakers Based on a Short Untranscribed Sample", Thirty-fifth International Conference on Machine Learning, Jul. 10-15, 2018, Stockholm, Sweden, 9 pages.
Nakamura et al., "The ATR Multilingual Speech-to-Speech Translation System", IEEE Transactions on Audio, Speech, and Language Processing, vol. 25, No. 2, Mar. 2006, 12 pages.
Ney, "Speech Translation: Coupling of Recognition and Translation", IEEE International Conference on Acoustics, Speech, and Signal Processing, Mar. 15-19, 1999, Phoenix, AZ, 4 pages.
Oord et al., "Parallel WaveNet: Fast High-Fidelity Speech Synthesis", International Conference on Machine Learning, Jul. 10-15, 2018, Stockholm, Sweden, 9 pages.
Panayotov et al., "LibriSpeech: An ASR Corpus Based on Public Domain Audio Books", IEEE International Conference on Acoustics, Speech and Signal Processing, Apr. 19-24, 2015, Queensland, Australia, 5 pages.
Papineni et al., "BLEU: a Method for Automatic Evaluation of Machine Translation", $40^{th}$ Annual Meeting of the Association for Computational Linguistics (ACL), Jul. 6-12, 2002, Philadelphia, PA, 8 pages.
Post et al., "Improved Speech-to-Text Translation with the Fisher and Callhome Spanish-English Speech Translation Corpus", International Workshop on Spoken Language Translation, Dec. 5-6, 2013, Heidelberg, Germany, 7 pages.
Shazeer et al., "Adafactor: Adaptive Learning Rates with Sublinear Memory Cost", International Conference on Machine Learning, Jul. 10-15, 2018, Stockholm, Sweden, 9 pages.
Shen et al., "Lingvo: a Modular and Scalable Framework for Sequence-to-Sequence Modeling", arXiv:1902.08295v1, Feb. 21, 2019, 17 pages.
Shen et al., "Natural TTS Synthesis by Conditioning WaveNet on Mel Spectrogram Predictions", arXiv:1712.05884v1, Dec. 16, 2017, 5 pages.
Vidal, "Finite-State Speech-To-Speech Translation", IEEE International Conference on Acoustics, Speech, and Signal Processing (ICASSP '97), Apr. 21-24, 1997, Munich, Germany, 4 pages.
Wahlster, "Mobile Speech-to-Speech Translation of Spontaneous Dialogs: An Overview of the Final Vermobil System", Verbmobil: Foundations of Speech-to-Speech Translation, Springer, Jul. 2000, pp. 3-21.
Wang et al., "Style Tokens: Unsupervised Style Modeling, Control and Transfer in End-to-End Speech Synthesis", International Conference on Machine Learning, Jul. 10-15, 2018, Stockholm, Sweden, 10 pages.
Wang et al., "Tacotron: Towards End-To-End Speech Synthesis", arXiv:1703.10135v2, Apr. 6, 2017, 10 pages.
Weiss et al., "Sequence-to-Sequence Models Can Directly Translate Foreign Speech", arXiv:1703.08581v2, Jun. 12, 2017, 5 pages.
Wester et al., "Speaker adaptation and the evaluation of speaker similarity in the EMIME speech-to-speech translation project", Seventh ISCA Tutorial and Research Workshop on Speech Synthesis, Sep. 22-24, 2010, Kyoto, Japan, 6 pages.
Wu et al., "Google's Neural Machine Translation System: Bridging the Gap between Human and Machine Translation", arXiv:1609.08144v2, Oct. 8, 2016, 23 pages.
Zhang et al., "Fully Supervised Speaker Diarization", arXiv:1810.04719v7, Feb. 19, 2019, 5 pages.

(56) References Cited

OTHER PUBLICATIONS

Zhang et al., "Sequence-to-Sequence Acoustic Modeling for Voice Conversion", arXiv:1810,06865v5, Jan. 12, 2020, 13 pages.
Haque et al, "Conditional End-to-End Audio Transforms", arXiv:1804v2, Jun. 7, 2018, 6 pages.
International Search Report for PCT/US2020/023169, dated Jul. 1, 2020, 2 pages.
Jia et al, "Direct Speech-to-Speech Translation with a Sequence-to-Sequence Model", arXiv:1904v2, Jun. 25, 2019, 6 pages.
Vaswani et al, "Attention Is All You Need", arXiv:1706v5, Dec. 6, 2017, 16 pages.

* cited by examiner

DIRECT SPEECH-TO-SPEECH TRANSLATION VIA MACHINE LEARNING

PRIORITY CLAIM

The present application is a national stage filing under 35 U.S.C. § 371 of Patent Cooperation Treaty Application Serial No. PCT/US2020/023169, filed on Mar. 7, 2020, which claims the benefit of U.S. Provisional Application 62/826,258 having a filing date of Mar. 29, 2019. Applicant claims priority to and the benefit of each of such applications and incorporate all such applications herein by reference in their entirety.

FIELD

The present disclosure relates generally to machine learning. More particularly, the present disclosure relates to direct and text-free speech-to-speech translation by machine-learned models such as, for example, sequence-to-sequence models.

BACKGROUND

Speech-to-speech translation (S2ST) refers to the process of translating speech in one language (e.g., as represented by a first speech waveform) into speech in another, different language (e.g., as represented by a second, different speech waveform). Conventional S2ST systems rely on a cascaded approach in which multiple disparate systems are combined to perform the translation. In particular, conventional S2ST system are often broken into three components which operate separately and in sequence: automatic speech recognition (ASR), text-to-text machine translation (MT), and text-to-speech (TTS) synthesis.

Cascaded systems have the potential of compounding errors between components such as, for example, when recognition errors lead to larger translation errors. Cascaded systems also have other disadvantages, primarily in terms of increased computational requirements and higher inference latency since multiple distinct computational steps are necessary. In addition, cascaded systems struggle to retain paralinguistic and non-linguistic information during translation such as, for example, maintaining the source speaker's voice, intonation, emotion, and prosody, in the synthesized translated speech. Finally, cascaded systems are unable to learn to generate fluent pronunciations of words which do not need be translated, such as names or other proper nouns.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors. The computing system includes a machine-learned translation model configured to perform direct and text-free translation. The machine-learned translation model includes an encoder model configured to receive and process a series of input acoustic feature representations that are representative of a first speech in a first language to generate a series of hidden state representations. The machine-learned translation model includes an attention model configured to receive and process the series of hidden state representations to generate a series of attention outputs. The machine-learned translation model includes a decoder model configured to receive and process the series of attention outputs to generate a series of output acoustic feature representations that are representative of a second speech in a second language that is different than the first language. The computing system includes one or more non-transitory computer-readable media that collectively store instructions that, when executed by the one or more processors, cause the computing system to perform operations. The operations include obtaining the series of input acoustic feature representations that are representative of the first speech in the first language. The operations include inputting the series of input acoustic feature representations into the encoder model of the machine-learned translation model. The operations include receiving the series of output acoustic feature representations that are representative of the second speech in the second language as an output of the decoder model.

The operations may further comprise backpropagating a loss function through the machine-learned translation model to train the machine-learned translation model. The loss function may evaluate a respective difference between each of the series of output acoustic feature representations and a corresponding ground truth acoustic feature representation derived from the second speech in the second language. One or more auxiliary speech recognition models may be configure to receive and process information from the encoder model to predict one or more items of textual content associated with the first speech in the first language or the second speech in the second language. The operations may further comprise backpropagating one or more auxiliary loss functions respectively associated with the one or more auxiliary speech recognition models through at least a portion of the encoder model to train at least the portion of the encoder model. Each auxiliary loss function evaluates a respective difference between the one or more items of textual content output by the corresponding auxiliary speech recognition model and a corresponding ground truth item of textual content associated with the first speech in the first language or the second speech in the second language. The one or more auxiliary speech recognition models may comprise one or more first speech recognition models configured to receive and process the information from the encoder model to predict textual representations of one or more of phonemes, graphemes, words, or n-grams included in the first speech in the first language. The one or more auxiliary speech recognition models may comprise one or more second speech recognition models configured to receive and process the information from the encoder model to predict textual representations of one or more of phonemes, graphemes, words, or n-grams included in the second speech in the second language.

The encoder model may comprise a multi-layer model. The information from the encoder model that is received and processed by the one or more first speech recognition models may be extracted from a relatively earlier layer of the encoder model relative to the information from the encoder model that is received and processed by the one or more second speech recognition models.

A speaker encoder model may be configured to receive and process data descriptive of reference speech uttered by a target speaker to generate a speaker embedding. The operations may further comprise inputting the speaker embedding into the attention model alongside the series of hidden state representations. During training of the machine-learned translation model, the target speaker may also be a second speaker that spoke the second speech in the second language. During inference performed by the machine-learned translation model, the target speaker may also be a first speaker that spoke the first speech in the first language.

The attention model may comprise a multi-headed attention model. The attention model may comprise a multi-headed attention model that performs additive attention. The machine-learned translation model may comprise a sequence-to-sequence model. One or both of the encoder model and the decoder model may comprise neural networks. One or both of the encoder model and the decoder model may comprise recurrent neural networks. One or both of the encoder model and the decoder model may comprise long short term memory recurrent neural networks. One or both of the encoder model and the decoder model may comprise bidirectional recurrent neural networks.

One or both of the series of input acoustic feature representations may comprise a series of input spectrogram. The series of output acoustic feature representations may comprise a series of output spectrograms. One or both of the input spectrograms may comprise logarithmic spectrograms or linear spectrograms. The output spectrograms may comprise logarithmic spectrograms or linear spectrograms.

A vocoder may be configured to receive and process the series of output acoustic feature representations to generate a waveform of the second speech in the second language. The operations may further comprise inputting the series of output acoustic feature representations directly into the vocoder and receiving the waveform of the second speech as an output of the vocoder. The vocoder may comprise a Griffin-Lim vocoder or an autoregressive neural network.

Other aspects of the present disclosure are directed to various systems, apparatuses, non-transitory computer-readable media, user interfaces, and electronic devices configured to perform, or to enable to be performed, one or more of the methods described herein.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
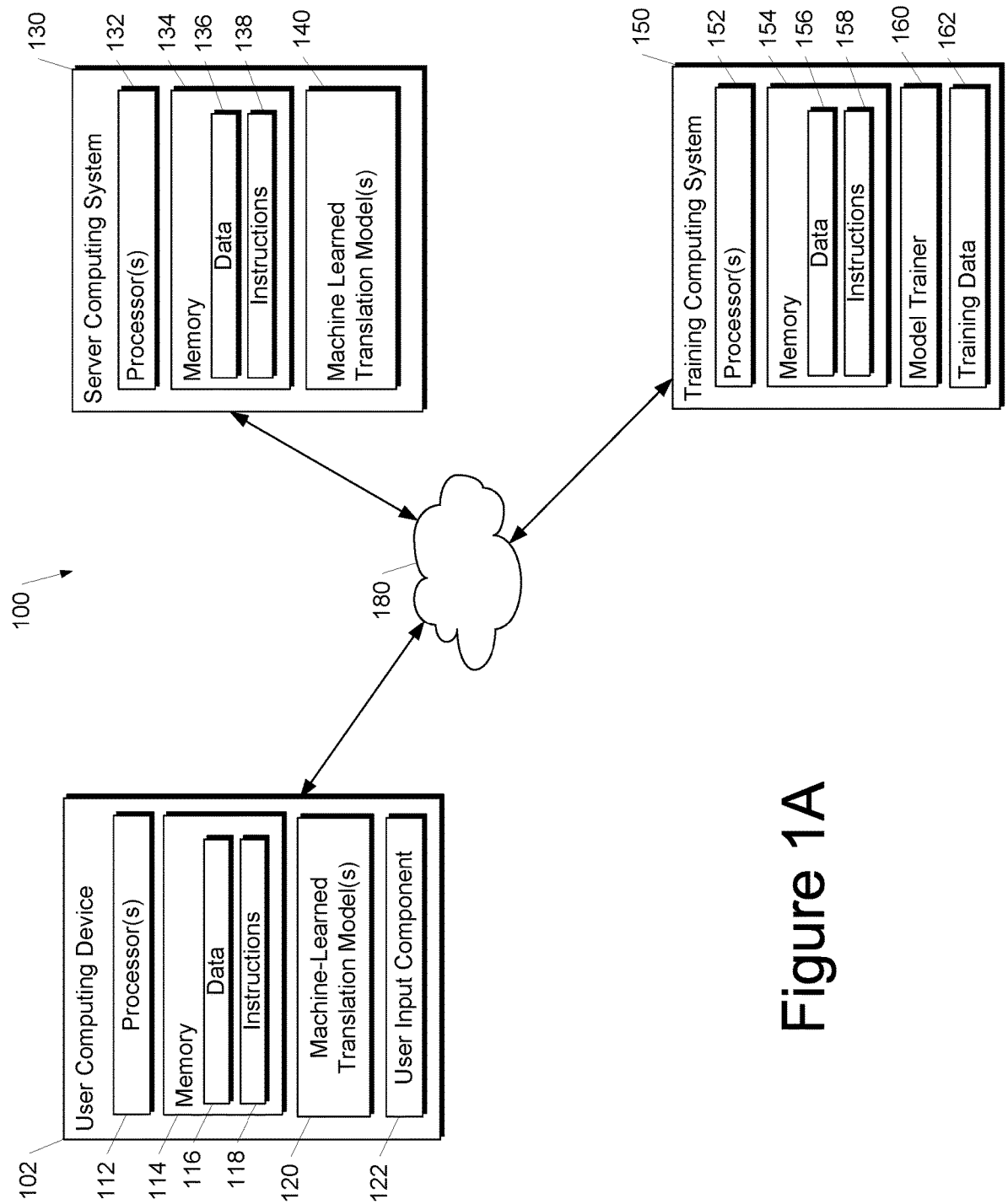
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods that train and use machine-learned models such as, for example, sequence-to-sequence models, to perform direct and text-free speech-to-speech translation. In particular, aspects of the present disclosure provide an attention-based sequence-to-sequence neural network which can directly translate speech from one language into speech in another language, without relying on an intermediate text representation. According to one aspect of the present disclosure, the machine-learned models described herein can be trained end-to-end, learning to map acoustic feature representations (e.g., spectrograms) of speech in a first language (e.g., Spanish) directly into acoustic feature representations (e.g., spectrograms) of speech in a second language (e.g., English). For example, the speech in the second language can correspond to translated content of the speech in the first language (e.g., which may also be in a different voice). According to another aspect of the present disclosure, additional techniques are provided which enable the machine-learned models to synthesize the translated speech using the voice of a target speaker (e.g., which may, in some instances, be the source speaker that is uttering the speech to be translated). According to yet another aspect of the present disclosure, multitask training can be performed by incorporating auxiliary decoder networks to predict the source or target transcripts, thereby improving performance of the machine-learned translation models. Finally, U.S. Provisional Patent Application No. 62/826,258, which is incorporated into and forms a portion of this disclosure, describes example experiments performed on example implementations of the systems and methods described herein which demonstrate the feasibility of the proposed approaches.

More particularly, example aspects of the present disclosure address the task of speech-to-speech translation (S2ST): translating speech in one language into speech in another. This application is highly beneficial for breaking down communication barriers between people who do not share a common language. Specifically, example systems are provided that can train an end-to-end model to accomplish this task directly, without relying on an intermediate text representation. This is in contrast to conventional S2ST systems which are often broken into three components: automatic speech recognition (ASR), text-to-text machine translation (MT), and text-to-speech (TTS) synthesis.

Cascaded systems have the potential of compounding errors between components, e.g. recognition errors leading to larger translation errors. By training to solve the task end-to-end, direct S2ST models avoid this issue. They also have other advantages over cascaded systems, primarily in terms of reduced computational requirements and lower inference latency since only one decoding step is necessary, instead of three. In addition, end-to-end training naturally enables models to retain paralinguistic and non-linguistic information during translation, e.g. maintaining the source speaker's voice, intonation, emotion, and prosody, in the synthesized translated speech. Finally, end-to-end approaches enable the models to learn to generate fluent pronunciations of words which do not need be translated, such as names or other proper nouns.

Thus, aspects of the present disclosure are directed to a machine-learned translation model that can perform direct and text-free translation and which can be trained in an end-to-end fashion. As one example, the machine-learned translation model can be a sequence-to-sequence model that includes an encoder model, an attention model, and a decoder model. The encoder model can be configured to receive and process a series of input acoustic feature representations that are representative of first speech in a first language to generate a series of hidden state representations. The attention model can be configured to receive and process the series of hidden state representations to generate a series of attention outputs. The decoder model can be configured to receive and process the series of attention outputs to generate a series of output acoustic feature representations that are representative of second speech in a second language that is different than the first language.

To train the machine-learned translation model, a computing system can obtain a set of training data that includes a number of pairs of training examples. Each training example can include data descriptive of first speech in a first language and data descriptive of second speech in a second language, wherein the second speech includes the same content (e.g., underlying expression or statement) as the first speech, but in a different language. As an example, the data descriptive of the first speech and second speech can be digital recordings of the first speech and second speech which may take the form of digitized speech waveforms. The computing system can generate a respective series of acoustic feature representations for both the first speech and the second speech. Example acoustic feature representations include various forms of spectrograms such as, as examples, linear frequency spectrograms or logarithmic frequency spectrograms (e.g., log-mel spectrograms). In particular, the series of acoustic feature representations generated based on the data descriptive of the second speech can be treated as ground truth acoustic feature representations which the translation model will attempt to predict.

Specifically, the computing system can input the series of acoustic feature representations generated based on the data descriptive of the first speech in the first language into the machine-learned translation model. In response, the translation model can predict a series of output acoustic feature representations for the second speech in the second language. The computing system can evaluate a loss function that evaluates a respective difference between each of the series of output acoustic feature representations and a corresponding ground truth acoustic feature representation derived from the second speech in the second language. The computing system can backpropagate the loss function through the translation model (e.g., first through the decoder model, then through the attention model, and then through the encoder model) to train the translation model. For example, values of parameters of the translation model can be updated using a gradient descent approach. Thus, the translation model can learn to predict output acoustic feature representations that match the ground truth representations associated with the ground truth translated speech.

After training, the machine-learned translation model can operate to enable direct translation of speech from the first language to the second language. In particular, at inference time, a computing system (which may be the same or different than the system that performed training of the model) can obtain data descriptive of input speech in the first language (e.g., a digital waveform of the input speech in the first language). The computing system can generate a series of input acoustic feature representations (e.g., spectrograms) descriptive of the input speech in the first language and can provide the series of input acoustic feature representations as an input to the machine-learned translation model (e.g., as a direct input into the encoder model). The machine-learned translation model can generate a series of output acoustic feature representations associated with predicted speech in the second language. The computing system can generate, for example through use of a vocoder, a predicted speech waveform for the speech in the second language. In some implementations, the computing system can cause playback of the speech waveform for the predicted speech in the second language in real-time, such that the input speech in the first language is quickly and efficiently translated directly into audible speech in the second language.

In some respects, the S2ST models proposed herein resemble recent work on sequence-to-sequence models for voice conversion, which is the task of recreating an utterance in the same language but in a different person's voice. For example, certain existing voice conversion approaches include an attention-based model to generate spectrograms in the target voice based on input features (e.g., spectrogram concatenated with bottleneck features from an speech recognition model) from the source voice. However, in contrast to the model proposed in the present disclosure, the alignment of input and output in the voice conversion task is much simpler. In addition, the existing voice conversion approaches only train models which are specific to a single input-output speaker pair (i.e. one-to-one voice conversion), whereas the models of the present disclosure are capable of many-to-one and many-to-many speaker configurations.

With reference now to the Figures, example embodiments of the present disclosure will be discussed in further detail.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned translation models 120. In some implementations, a machine-learned translation model 120 can totally run on the device-side (e.g., on the user computing device 102) without involving the server computing system 130. For example, the machine-learned translation models 120 can be or can otherwise include various machine-learned models such as neural networks (e.g., deep neural networks) or other types of machine-learned models, including non-linear models and/or linear models. Neural networks can include feedforward neural networks, recurrent neural networks (e.g., long short-term memory recurrent neural networks), convolutional neural networks or other forms of neural networks. Example machine-learned translation models 120 are discussed with reference to FIGS. 2-5.

In some implementations, the one or more machine-learned translation models 120 can be received from the server computing system 130 over network 180, stored in the user computing device memory 114, and then used or otherwise implemented by the one or more processors 112. In some implementations, the user computing device 102 can implement multiple parallel instances of a single machine-learned translation model 120 (e.g., to perform parallel speech-to-speech translation across multiple instances of input speech).

Additionally or alternatively, one or more machine-learned translation models 140 can be included in or otherwise stored and implemented by the server computing system 130 that communicates with the user computing device 102 according to a client-server relationship. For example, the machine-learned translation models 140 can be implemented by the server computing system 140 as a portion of a web service (e.g., a speech-to-speech translation service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned translation models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned translation models 120 and/or 140 based on a set of training data 162. The training data 162 can include, for example, a number of pairs of training examples. Each training example pair can include data descriptive of first speech in a first language and data descriptive of second speech in a second language, wherein the second speech includes the same content (e.g., underlying expression or statement) as the first speech, but in a different language. As an example, the data descriptive of the first speech and the second speech can be digital recordings of the first speech and second speech which may take the form of digitized speech waveforms. Thus, to provide an example, a particular training example pair can include a first speech waveform that includes utterance of the Spanish sentence "Me gusta comer la cocina de mi abuela" and a second speech waveform that includes utterance of same content in English: "I like to eat my grandmother's cooking". The respective speakers of the Spanish and English utterances can be the same person or can be different people. Any different pair of languages can be used.

In some implementations, the training data 162 can further include textual transcriptions of the utterances (e.g., in both languages). For example, the textual transcriptions can be manually generated by listening to the utterances and/or the utterances can be generated by reading pre-existing textual transcriptions. In yet further examples, some or all of the utterances included in training example pairs can be synthesized utterances generated using a text-to-speech system such as, for example, a Parallel WaveNet system.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
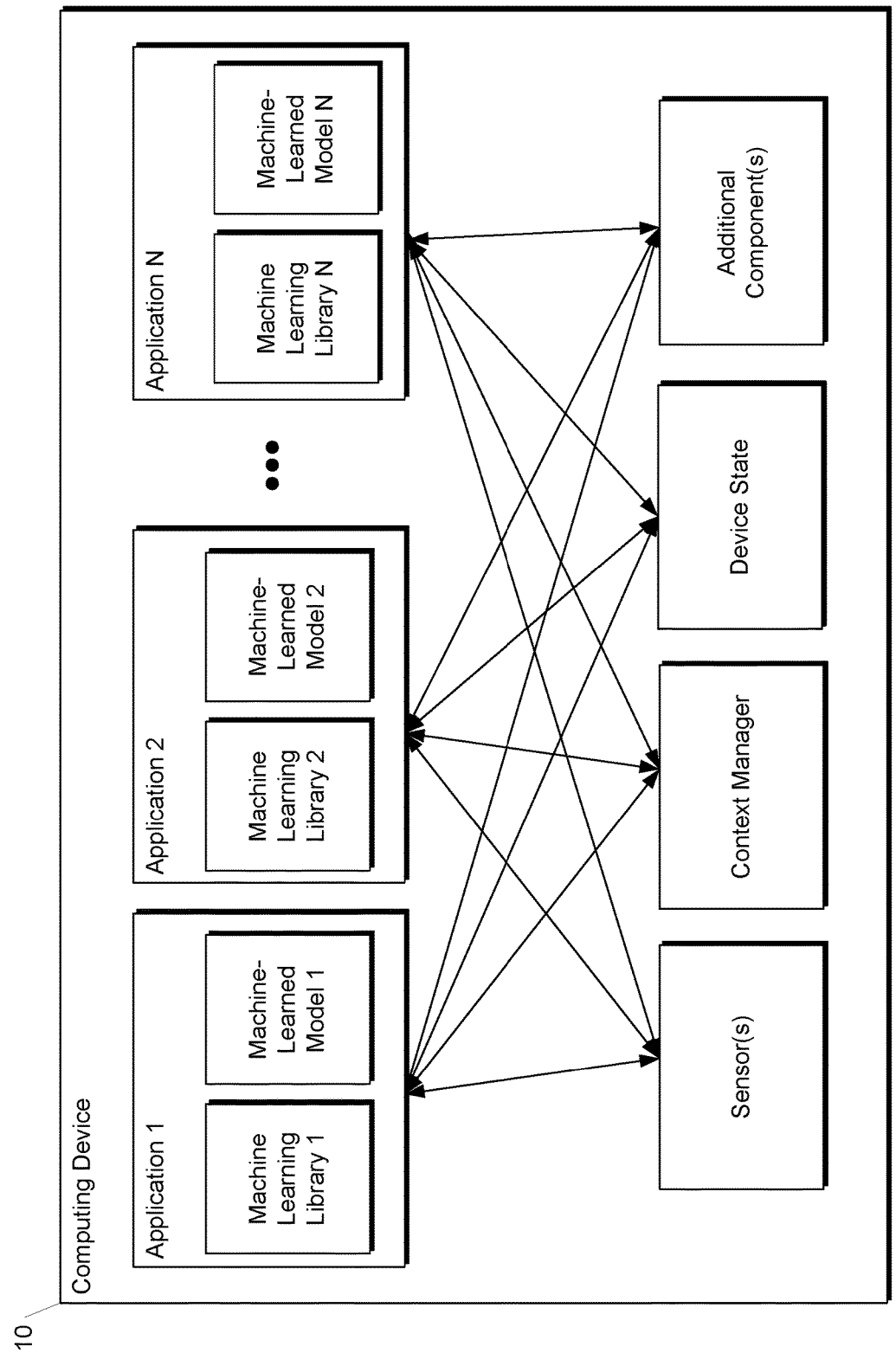
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
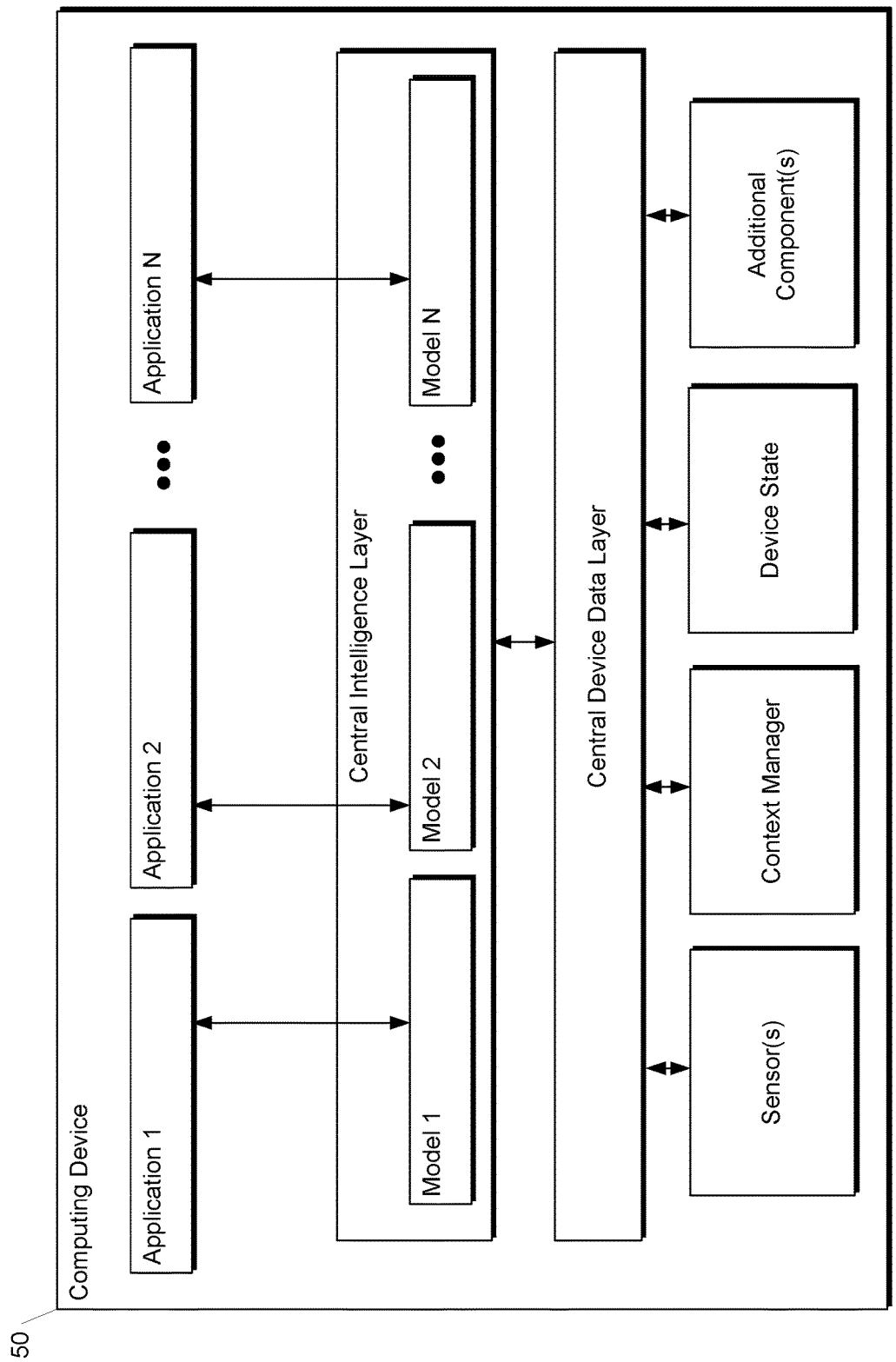
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
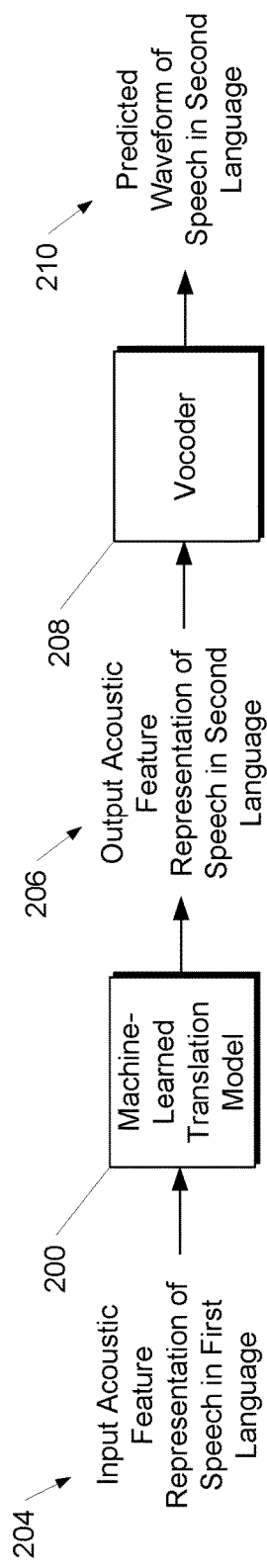
FIG. 2 depicts a block diagram of an example machine-learned translation model according to example embodiments of the present disclosure.

FIG. 2 depicts a block diagram of an example machine-learned translation model 200 according to example embodiments of the present disclosure. In some implementations, the machine-learned translation model 200 is trained to receive a series of input acoustic feature representations 204 descriptive of speech in a first language and, as a result of receipt of the series of input acoustic feature representations 204, provide a series of output acoustic feature representations 206 descriptive of speech in a second language. Thus, the machine-learned translation model 200 can directly translate from acoustic feature representations of speech in one language to acoustic feature representations of speech in another language.

The series of input acoustic feature representations 204 can be derived from data descriptive of first speech in a first language. For example, the data descriptive of the first speech can be a digital recording of the first speech which may, for example, take the form of a digitized speech waveform. Example acoustic feature representations include various forms of spectrograms such as, as examples, linear frequency spectrograms or logarithmic frequency spectrograms (e.g., log-mel spectrograms). In some implementations, one input spectrogram can be generated for each of a number of time steps into which the input waveform is discretized.

To train the machine-learned translation model 200, a computing system can obtain a set of training data that includes a number of pairs of training examples. Each training example pair can include data descriptive of first speech in a first language and data descriptive of second speech in a second language, wherein the second speech includes the same content (e.g., underlying expression or statement) as the first speech, but in a different language. As an example, the data descriptive of the first speech and second speech can be digital recordings of the first speech and second speech which may take the form of digitized speech waveforms. The computing system can generate a respective series of acoustic feature representations for both the first speech and the second speech. In particular, the series of acoustic feature representations generated based on the data descriptive of the second speech can be treated as ground truth acoustic feature representations which the translation model will attempt to predict.

Specifically, the computing system can input the series of input acoustic feature representations 204 generated based on the data descriptive of the first speech in the first language into the machine-learned translation model 200. In response, the translation model can predict the series of output acoustic feature representations 206 for the second speech in the second language. The computing system can evaluate a loss function that evaluates a respective difference between each of the series of output acoustic feature representations 206 and a corresponding ground truth acoustic feature representation derived from the second speech in the second language. The computing system can backpropagate the loss function through the translation model 200 to train the translation model 200. For example, values of parameters of the translation model 200 can be updated using a gradient descent approach. Thus, the translation model 20 can learn to predict output acoustic feature representations 206 that match the ground truth representations associated with the ground truth translated speech.

After training, the machine-learned translation model 200 can operate to enable direct translation of speech from the first language to the second language. In particular, at inference time, a computing system (which may be the same or different than the system that performed training of the model) can obtain data descriptive of input speech in the first language (e.g., a digital waveform of the input speech in the first language). The computing system can generate a series of input acoustic feature representations 204 (e.g., spectrograms) descriptive of the input speech in the first language and can provide the series of input acoustic feature representations 204 as an input to the machine-learned translation model 200. The machine-learned translation model can generate the series of output acoustic feature representations 206 associated with predicted speech in the second language. The number of output acoustic feature representations 206 can be the same as or different than the number of input acoustic feature representations 204. For example, in some implementations, two spectrogram frames can be predicted for each time step.

The computing system can generate, for example through use of a vocoder 208, a predicted speech waveform 210 for the speech in the second language. Thus, the vocoder 208 can convert the spectrograms into time-domain waveforms. Example vocoders include a Griffin-Lim vocoder and/or an autoregressive neural network such as the WaveRNN neural vocoder.

In some implementations, the computing system can cause playback of the predicted speech waveform 210 for the speech in the second language in real-time, such that the input speech in the first language is quickly and efficiently translated directly into audible speech in the second language.

Figure 3:
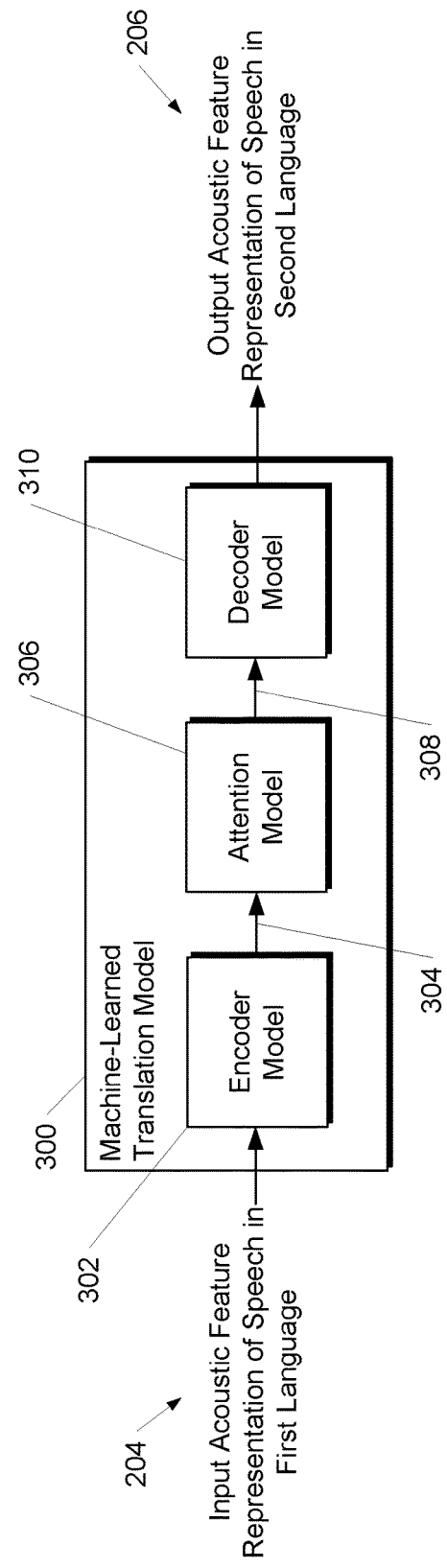
FIG. 3 depicts a block diagram of an example machine-learned translation model that includes encoder, attention, and decoder models according to example embodiments of the present disclosure.

FIG. 3 depicts a block diagram of an example machine-learned translation model 300 according to example embodiments of the present disclosure. The machine-learned translation model 300 is similar to translation model 200 of FIG. 2 except that translation model 300 is illustrated as including an encoder model 302, an attention model 306, and a decoder model 310.

The encoder model 302 can be configured to receive and process a series of input acoustic feature representations 204 that are representative of first speech in a first language to generate a series of hidden state representations 304. The encoder model 302 can be configured to operate directly on the feature representations 204 (e.g., spectrograms). Thus, in some implementations, the feature representations 204 (e.g., spectrograms) can be directly input into the encoder model 302 without any intermediate temporal reduction.

In some implementations, the encoder model 302 can have a significantly increased capacity in order to handle the challenging speech-to-speech translation task. For example, the encoder model 302 can be relatively deeper than encoders used for other tasks. As one example, the encoder model 302 can include a stack of 8 bidirectional LSTM layers.

The attention model can be configured to receive and process the series of hidden state representations 304 to generate a series of attention outputs 308. The decoder model can be configured to receive and process the series of attention outputs 308 to generate a series of output acoustic feature representations 206 that are representative of second speech in a second language that is different than the first language.

In some implementations, the decoder model 310 can have an architecture similar to the models described in U.S. patent application Ser. No. 16/058,640 titled "Synthesizing Speech from Text Using Neural Networks", which is incorporated herein by reference in its entirety. In particular, similar to the models described in U.S. patent application Ser. No. 16/058,640, the decoder model 310 can include pre-net, autoregressive LSTM stack, and post-net components. However, in some implementations, the architecture described in U.S. patent application Ser. No. 16/058,640 can be modified to use the multi-head additive attention (e.g., with 4 heads) for attention model 306, rather than a location-sensitive attention.

In some implementations, a significantly narrower 32 dimensional pre-net bottleneck can be used rather than a 256-dimension. In some implementations, a reduction factor of 2 can be used, such that two spectrogram frames are predicted for each decoder time step. In some implementations, the decoder model 310 can include 4, 6, or other numbers of LSTM layers. In some implementations, the decoder model 310 can use attention dropout, LSTM zone-out regularization, all with probability 0.1 For example, training can use the Adafactor optimizer with a batch size of 1024.

In one particular example, the encoder model 302 can map input acoustic feature representations 204 which take the form of 80-channel log-mel spectrogram features into the hidden state representations 304 which are passed to the attention model 306 which can perform an attention-based alignment mechanism to condition the decoder model 310 (e.g., which can be an autoregressive decoder) which, in turn, predicts the output acoustic feature representations 206 in the form of 1025-dim log-compressed spectrogram frames corresponding to the translated speech. In some implementations, the input feature frames can be created by stacking (e.g., with deltas and accelerations) a number (e.g., 3) of adjacent frames of an 80-channel log-mel spectrogram.

Figure 4:
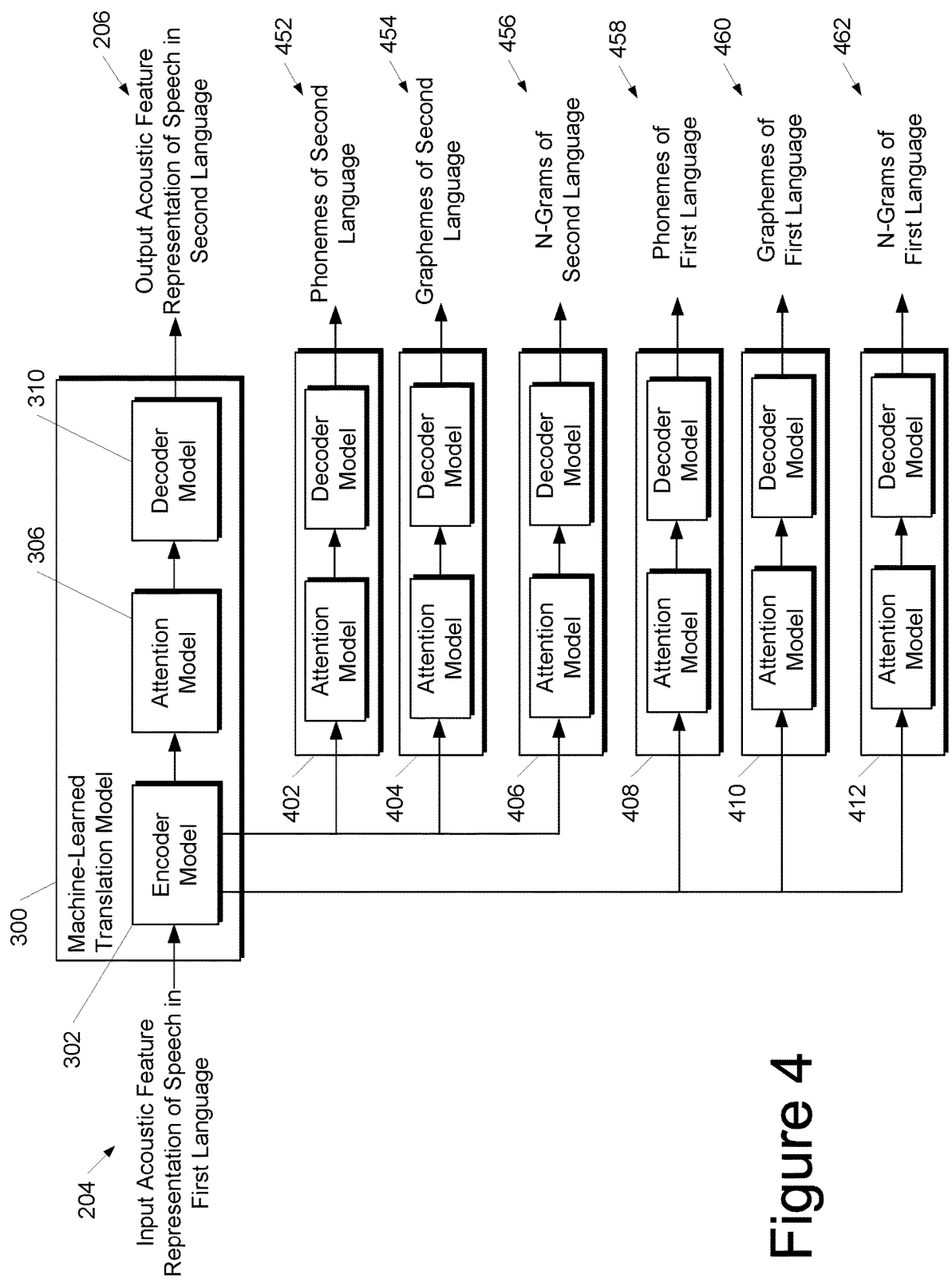
FIG. 4 depicts a block diagram of an example machine-learned translation model that is trained in a multi-task training scheme according to example embodiments of the present disclosure.

FIG. 4 depicts a block diagram of the example machine-learned translation model 300 of FIG. 3 in which the translation model 300 is being trained in a multi-task training scheme according to example embodiments of the present disclosure. In particular, in the illustrated training scheme, the machine-learned translation model 300 is being trained alongside a plurality of auxiliary speech recognition models 402-412.

Although six auxiliary speech recognition models 402-412 are illustrated, any number of different speech recognition models can be used (e.g., one, two, three, etc.). Thus, each of the auxiliary speech recognition models 402-412 is optional. Any combination of them may be used, and, in some embodiments, none of them are used. Furthermore, in some implementations, the auxiliary speech recognition models 402-412 are used only during training to assist in training the machine-learned translation model 300. In such implementations, the auxiliary speech recognition models 402-412 are not used or implemented during inference.

Each of the auxiliary speech recognition models 402-412 is configured to receive and process information from the encoder model 302 to predict one or more items of textual content associated with the first speech in the first language or the second speech in the second language. As examples, the model 402 is configured to predict phonemes 452 of the speech in the second language; the model 404 is configured to predict graphemes 454 of the speech in the second language; the model 406 is configured to predict n-grams 456 of the speech in the second language; the model 408 is configured to predict phonemes 458 of the speech in the first language; the model 410 is configured to predict graphemes 460 of the speech in the first language; and the model 412 is configured to predict n-grams 462 of the speech in the first language.

To perform the multi-task learning scheme, in addition to the loss function that is based on the output acoustic feature representations 206, the computing system can further back-propagate one or more additional loss functions through at least a portion of the encoder model 302 to train at least the portion of the encoder model 302. In particular, each additional loss function can correspond to one of the models 402-412 and can evaluates a respective difference between each of the one or more items of textual content predicted by such model and a corresponding ground truth item of textual content associated with the first speech in the first language or the second speech in the second language. Thus, as one example, an additional loss function associated with model 402 might evaluate a difference between the predicted phonemes 452 of the speech in the second language to the ground truth phonemes actually contained in the speech of the second language. Thus, the additional loss function(s) can serve to regularize the encoder model 302 and assist the encoder model 302 in capturing information relevant to phonemes, graphemes, n-grams, and/or the like.

Although each of the auxiliary speech recognition models 402-412 is illustrated as including a respective attention model and respective decoder model, the models 402-412 may have different architectures than illustrated. In some implementations, the attention model in each of the auxiliary speech recognition models 402-412 is a single-head additive attention model. In some implementations, the decoder model in each of the auxiliary speech recognition models 402-412 is a 2-layer LSTM. In some implementations, the decoder model in each of the auxiliary speech recognition models 402-412 uses attention dropout, LSTM zone-out regularization, all with probability 0.1 For example, training can use the Adafactor optimizer with a batch size of 1024.

As illustrated in FIG. 4, the output of the final layer of the encoder model 302 is passed to the primary attention and decoder models 306 and 310, whereas intermediate activations of the encoder model 302 are passed to auxiliary models 402-412, which predict textual sequences corresponding to the source and target speech. As illustrated, the information from the encoder model 302 that is received and processed by the auxiliary speech recognition models 408-412 that predict aspects of the first language is extracted from a relatively earlier layer of the encoder model 302 relative to the information from the encoder model 302 that is received and processed by the auxiliary speech recognition models 402-406 that predict aspects of the second language. This is because the early layers of the encoder model 302 are more likely to represent the first language content well, whereas deeper layers might learn to encode more information about the second language content.

Figure 5:
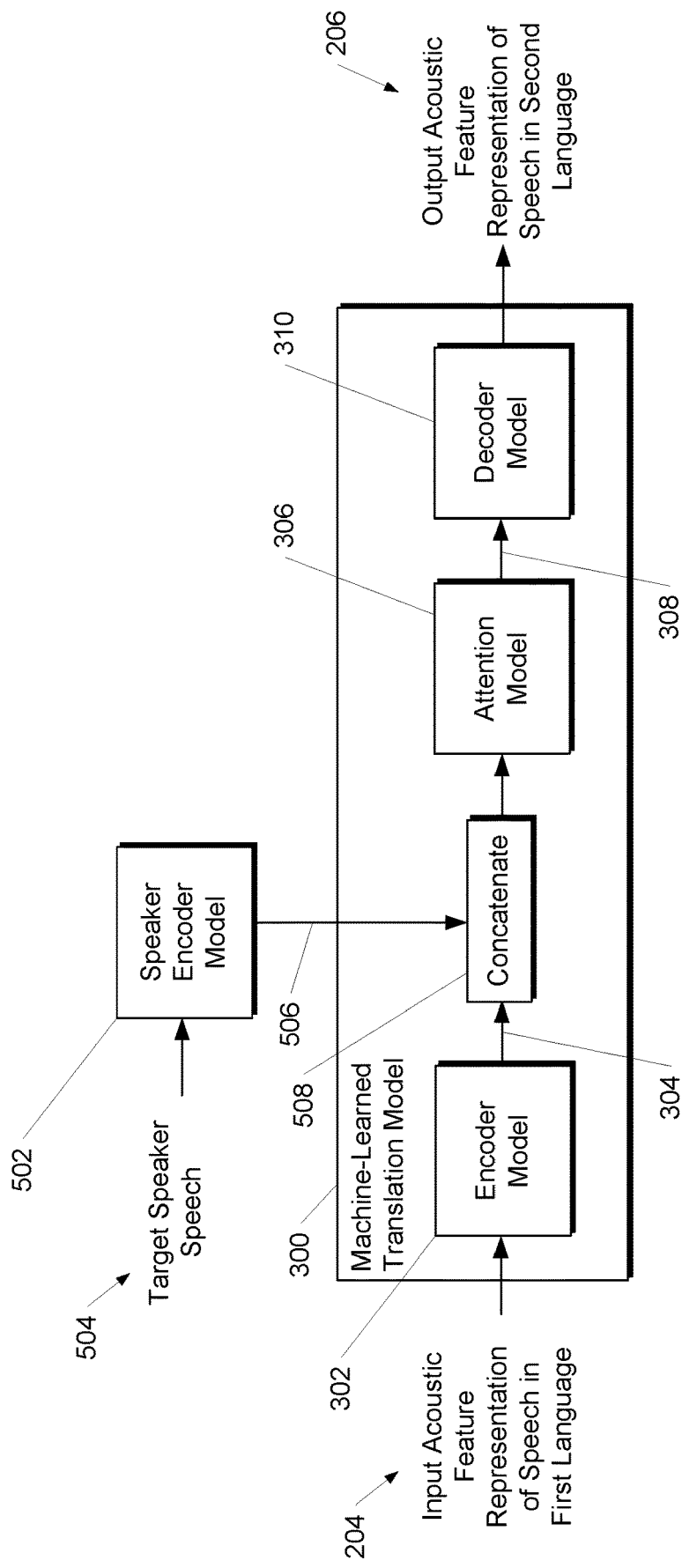
FIG. 5 depicts a block diagram of an example machine-learned translation model able to generate translations that sound similar to a target speaker according to example embodiments of the present disclosure.

FIG. 5 depicts a block diagram of an example machine-learned translation model 300 able to generate translations that sound similar to a target speaker according to example embodiments of the present disclosure. In particular, as illustrated in FIG. 5, the machine-learned translation model 300 can be trained and/or used in conjunction with an additional speaker encoder model 502.

The speaker encoder model 502 can obtain reference speech 504 from a target speaker and can generate a speaker embedding 506 descriptive of the target speaker's speech. The speaker embedding 506 can be input into the attention model 306 alongside the series of hidden state representations 304. For example, a concatenation operation 508 can be performed to concatenate the speaker embedding 506 to (e.g., each of) the series of hidden state representations 304 prior to input into the attention model 306. The reference speech 504 can be in the first language or the second language.

In some implementations, during training of the machine-learned translation model 300, the target speaker that speaks the reference speech 504 is also a second speaker that spoke the second speech in the second language used to generate the ground truth acoustic feature representations. However, in some implementations, during inference performed by the machine-learned translation model 300, the target speaker that speaks the reference speech 504 is also a first speaker that spoke the first speech in the first language that is the object of the translation effort.

Thus, in order to control the output speaker identity (e.g., sound of the speech waveform produced from the predicted output acoustic feature representations 206), an optional speaker encoder model 502 can be incorporated into the system. For example, the speaker encoder model 502 can be a neural network. In some implementations, the speaker encoder model 502 can be discriminatively pretrained on a speaker verification task and used to condition the decoder model 310 by computing the speaker embedding 506 from the reference utterance 504. For example, the speaker embedding 506 can be 256 dimensions. For example, the speaker encoder model 502 can be trained on a set of 851K speakers across 8 languages including English and Spanish.

In some implementations, use of the speaker encoding model 502 and the speaker embedding 506 can enable cross language voice conversion simultaneously with translation.

Example embodiments shown in the Figures can be combined. For example, the speaker encoding model 502 and the speaker embedding 506 can be used simultaneous with use of one or more of the auxiliary speech recognition models 402-412.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
   one or more processors;
   a machine-learned translation model configured to perform direct and text-free translation, the machine-learned translation model comprising:
      an encoder model configured to receive and process a series of input acoustic feature representations that are representative of a first speech in a first language to generate a series of hidden state representations;
      an attention model configured to receive and process the series of hidden state representations to generate a series of attention outputs; and
      a decoder model configured to receive and process the series of attention outputs to generate a series of output acoustic feature representations that are representative of a second speech in a second language that is different than the first language;
   one or more auxiliary speech recognition models configured to receive and process information from the encoder model to predict one or more items of textual content associated with the first speech in the first language or the second speech in the second language; and
   one or more non-transitory computer-readable media that collectively store instructions that, when executed by the one or more processors, cause the computing system to perform operations, the operations comprising:
      obtaining the series of input acoustic feature representations that are representative of the first speech in the first language;
      inputting the series of input acoustic feature representations into the encoder model of the machine-learned translation model;
      receiving the series of output acoustic feature representations that are representative of the second speech in the second language as an output of the decoder model; and
      backpropagating one or more auxiliary loss functions respectively associated with the one or more auxiliary speech recognition models through at least a portion of the encoder model to train at least the portion of the encoder model, wherein each auxiliary loss function evaluates a respective difference between the one or more items of textual content output by the corresponding auxiliary speech recognition model and a corresponding ground truth item of textual content associated with the first speech in the first language or the second speech in the second language.

2. The computing system of claim 1, wherein the operations further comprise:
   backpropagating a loss function through the machine-learned translation model to train the machine-learned translation model, wherein the loss function evaluates a respective difference between each of the series of output acoustic feature representations and a corresponding ground truth acoustic feature representation derived from the second speech in the second language.

3. The computing system of claim 1, wherein the one or more auxiliary speech recognition models comprise one or more first speech recognition models configured to receive and process the information from the encoder model to predict textual representations of one or more of phonemes, graphemes, words, or n-grams included in the first speech in the first language.

4. The computing system of claim 1, wherein the one or more auxiliary speech recognition models comprise one or more second speech recognition models configured to receive and process the information from the encoder model to predict textual representations of one or more of phonemes, graphemes, words, or n-grams included in the second speech in the second language.

5. The computing system of claim 4, wherein:
   the encoder model comprises a multi-layer model; and
   the information from the encoder model that is received and processed by the one or more first speech recognition models is extracted from a relatively earlier layer of the encoder model relative to the information from the encoder model that is received and processed by the one or more second speech recognition models.

6. The computing system of claim 1, further comprising:
   a speaker encoder model configured to receive and process data descriptive of reference speech uttered by a target speaker to generate a speaker embedding;
   wherein the operations further comprise inputting the speaker embedding into the attention model alongside the series of hidden state representations.

7. The computing system of claim 6, wherein, during training of the machine-learned translation model, the target speaker is also a second speaker that spoke the second speech in the second language.

8. The computing system of claim 6, wherein, during inference performed by the machine-learned translation model, the target speaker is also a first speaker that spoke the first speech in the first language.

9. The computing system of claim 1, wherein the attention model comprises a multi-headed attention model.

10. The computing system of claim 1, wherein the attention model comprises a multi-headed attention model that performs additive attention.

11. The computing system of claim 1, wherein the machine-learned translation model comprises a sequence-to-sequence model.

12. The computing system of claim 1, wherein one or both of the encoder model and the decoder model comprise neural networks.

13. The computing system of claim 1, wherein one or both of the encoder model and the decoder model comprise recurrent neural networks.

14. The computing system of claim 1, wherein one or both of the encoder model and the decoder model comprise long short term memory recurrent neural networks.

15. The computing system of claim 1, wherein one or both of the encoder model and the decoder model comprise bidirectional recurrent neural networks.

16. The computing system of claim 1, wherein, one or both of:
the series of input acoustic feature representations comprise a series of input spectrograms; or
the series of output acoustic feature representations comprise a series of output spectrograms.

17. The computing system of claim 16, wherein, one or both of:
the input spectrograms comprise logarithmic spectrograms or linear spectrograms; or
the output spectrograms comprise logarithmic spectrograms or linear spectrograms.

18. The computing system of claim 1, further comprising:
a vocoder configured to receive and process the series of output acoustic feature representations to generate a waveform of the second speech in the second language;
wherein the operations further comprise:
inputting the series of output acoustic feature representations directly into the vocoder; and
receiving the waveform of the second speech as an output of the vocoder.

19. The computing system of claim 18, wherein the vocoder comprises a Griffin-Lire vocoder or an autoregressive neural network.

* * * * *

UNITED STATES PATENT AND TRADEMARK OFFICE
CERTIFICATE OF CORRECTION

PATENT NO. : 12,032,920 B2  
APPLICATION NO. : 17/056554  
DATED : July 9, 2024  
INVENTOR(S) : Ye Jia et al.

Page 1 of 1

It is certified that error appears in the above-identified patent and that said Letters Patent is hereby corrected as shown below:

On the Title Page

Item (22) PCT Filed: Please delete "Mar. 7, 2020" and insert --Mar. 17, 2020--

Signed and Sealed this  
Twenty-fourth Day of June, 2025

Coke Morgan Stewart  
*Acting Director of the United States Patent and Trademark Office*